United States Patent
Swearingen et al.

(10) Patent No.: US 10,821,489 B2
(45) Date of Patent: *Nov. 3, 2020

(54) ENCAPSULATED REACTANT AND PROCESS

(71) Applicant: Specialty Earth Sciences, LLC, New Albany, IN (US)

(72) Inventors: Jason Swearingen, Sellersburg, IN (US); Lindsay Swearingen, Sellersburg, IN (US)

(73) Assignee: Specialty Earth Sciences, LLC, New Albany, IN (US)

( * ) Notice: Subject to any disclaimer, the term of this patent is extended or adjusted under 35 U.S.C. 154(b) by 253 days.

This patent is subject to a terminal disclaimer.

(21) Appl. No.: 15/450,369

(22) Filed: Mar. 6, 2017

(65) Prior Publication Data

US 2017/0173649 A1 Jun. 22, 2017

Related U.S. Application Data

(60) Continuation of application No. 14/024,046, filed on Sep. 11, 2013, now Pat. No. 9,611,421, which is a division of application No. 13/088,217, filed on Apr. 15, 2011, now abandoned, which is a continuation of application No. 12/169,434, filed on Jul. 8, 2008, now abandoned.

(51) Int. Cl.
| | |
|---|---|
| *B09C 1/08* | (2006.01) |
| *B09C 1/00* | (2006.01) |
| *C02F 1/68* | (2006.01) |
| *C02F 1/72* | (2006.01) |
| *C09K 8/536* | (2006.01) |
| *C02F 103/06* | (2006.01) |

(52) U.S. Cl.
CPC ............ *B09C 1/08* (2013.01); *B09C 1/002* (2013.01); *C02F 1/688* (2013.01); *C02F 1/72* (2013.01); *C02F 1/722* (2013.01); *C09K 8/536* (2013.01); *B09C 2101/00* (2013.01); *C02F 2103/06* (2013.01)

(58) Field of Classification Search
None
See application file for complete search history.

(56) References Cited

U.S. PATENT DOCUMENTS

| | | | | |
|---|---|---|---|---|
| 6,063,363 | A * | 5/2000 | Goodwin | A61K 9/0043 424/439 |
| 9,611,421 | B2 * | 4/2017 | Swearingen | B09C 1/002 |

OTHER PUBLICATIONS

Harris, "Preparation and Release Characteristics of Potassium Chloride Microcapsules", Journal of Pharmaceutical Sciences, vol. 70, No. 4, Apr. 1981, pp. 391-394 (Year: 1981).*

* cited by examiner

*Primary Examiner* — Shamim Ahmed
*Assistant Examiner* — Bradford M Gates
(74) *Attorney, Agent, or Firm* — Witters & Associates; Steve Witters

(57) ABSTRACT

An encapsulated reactant(s) having at least one encapsulant and at least one reactant. An outermost encapsulant is substantially non-reacting, impermeable and non-dissolving with water. The reactant(s) contribute to at least one reaction with contaminants in environmental media rendering the environmental media less harmful. Processes for using the encapsulated reactant in environmental media is also hereby claimed.

10 Claims, 1 Drawing Sheet

ENCAPSULATED REACTANT AND PROCESS

CROSS-REFERENCE TO RELATED APPLICATIONS

The instant application is a continuation of and claims the benefit of co-pending U.S. patent application Ser. No. 14/024,046, filed on Sep. 11, 2013, which is a divisional of and claims the benefit of U.S. patent application Ser. No. 13/088,217, filed Apr. 15, 2011, which is a continuation of and claims the benefit of U.S. patent application Ser. No. 12/169,434 filed on Jul. 8, 2008, which in turn is a continuation of U.S. patent application Ser. No. 11/072,118 filed on Mar. 4, 2005, now issued as U.S. Pat. No. 7,431,849, which claims benefit of provisional U.S. patent application Ser. No. 60/550,799 filed on Mar. 5, 2004, each of which is incorporated by reference herein.

FIELD OF INVENTION

The present invention relates to reactant(s) and methods for the in situ and ex situ remediation of hazardous organic compounds in soil, groundwater, and surface water.

BACKGROUND OF THE INVENTION

Discharges of hazardous organic compounds into the environment have led to contamination of surface water, soil, and aquifers resulting in potential public health problems and degradation of the land for future use. As used in this specification and appended claims, hazardous organic compound means a chemical or substance that is either toxic or highly toxic, an irritant, corrosive, a strong oxidizer, a strong sensitizer, combustible, either flammable or extremely flammable, dangerously reactive, pyrophoric, pressure-generating, a compressed gas, a carcinogen, a teratogen, a mutagen, a reproductive toxic agent, or is suspected of having adverse health effects on humans. In many cases, subsurface groundwater contaminant plumes may extend hundreds to thousands of feet from the source area of chemical release resulting in extensive contamination. These chemical contaminants may then be transported into drinking water sources, lakes, rivers, and even basements of homes.

The U.S. Environmental Protection Agency (USEPA) has established maximum concentration limits (MCL's) for various hazardous organic compounds in water and soils. For instance, stringent drinking water limits placed on many solvent organic compounds in water can be as low as 0.005 mg/L (parts per billion).

The presence of hazardous organic compounds in subsurface soils, surface water, and groundwater is a well-documented and extensive problem. The source of these hazardous materials is often times from industry where the materials are released onto the soil surface or surface water or even into the subsurface soil and/or groundwater through leaking storage tanks. Many, if not most, of these organic compounds are capable of moving through the soil under the influence of moving water, gravity, or capillary action and serve as a source of groundwater contamination. As used in this specification and appended claims, soil is to be interpreted broadly to include all naturally occurring material found below ground surface (e.g. silts, clays, sands, rock, karsts, organics, tills, etc.).

Soil, surface water, groundwater, and wastewater can become contaminated by a variety of substances. The substances include, without limitation, volatile, semi-volatile, and non-volatile organic compounds. Common examples of such contaminates include PCBs, gasoline, oils, wood preservative wastes, and other hazardous organic compounds. Such other hazardous organic compounds may include, but not limited to, chlorinated solvents (such as trichloroethylene (TCE), vinyl chloride, tetrachloroethylene (PCE), dichloroethanes), ethylene dibromide, halobenzenes, polychlorinated biphenyls, acetone, tert-butyl alcohol, tert-butyl formate, and anilines. Additional contaminants include compounds containing at least one oxidizable aliphatic or aromatic compound and/or functional group (e.g. atrazine, benzene, butyl mercaptan, chlorobenzene, chloroethylvinyl ether, chloromethyl methyl ether, chlorophenol, chrysene, cyanide ion or organic cyanides, dichlorophenol, dichlorobenzene, dichloroethane, dichloroethene, dichloropropane, dichloropropene, ethyl alcohol, ethylbenzene, ethylene glycol, ethyl mercaptan, hydrogen sulfide, isopropyl alcohol, Lindane™, methylene chloride, methyl tertbutyl ether, naphthalene, nitrobenzene, nitrophenol, pentachlorophenol, phenanthrene, phenol, propylene, propylene glycol, Silvex™, Sirnazine™, sodium sulfide, tetrachloroethane, tetrachloroethene, toluene, trichlorobenzene, trichloroethane, trichloroethene, trichlorophenol, vinyl chloride, xylene, etc).

Contaminated soil, surface water and groundwater must be removed or treated to make it less toxic and to meet USEPA requirements. There are a variety of reactants and methods for treating contaminated soil, surface water, groundwater, and wastewater as discussed below.

Peroxydisulfates have been reported as applied constituents for organic carbon digestion or decomposition. Application methods include thermally activated persulfate oxidation in conjunction with an electro-osmosis system to heat and transport persulfate anions into soils.

Permanganate(s) and peroxygen(s) reactant(s) have also been reported as applied constituents for oxidation of organic compounds. Peroxygen compound(s) applied independently or in conjunction with a metallic salt catalyst(s) (complexed and not complexed; chelated and not chelated) have been shown to break down organic compounds within the soil, groundwater, and wastewater.

Groundwater and subsurface soil typically has been treated by injecting reactant(s), with or without a catalyst(s), within an aqueous mixture, slurry, or suspension into the subsurface. Injection into the subsurface is accomplished by gravity feed or the use of a pump(s) to increase well head pressure. This results in the subsurface dispersion of the reactant(s) within the area of the injection well.

Another method for in situ treatment of groundwater includes the excavation of a trench at or beyond a subsurface plume of organic and/or inorganic contaminant(s). The trench is filled with reactant(s) and a permeable media(s) (i.e. sand) for the plume to flow through, subsequently reacting all oxidizable organic and/or inorganic compounds that come into contact with the reactant(s).

The methods used for ex situ treatment or in situ treatment of surface contamination, water or soil, typically involves the direct application of the reactant(s) to the hazardous organic compound(s). In the case of ex situ surface soil treatment, the soil is often times mixed or tilled to ensure contact of the reactant(s) with the hazardous organic compound(s).

Meeting USEPA cleanup criteria with these reactants and methods of the prior art has been found to be difficult, costly, and even impossible. With some of these current methods and reactants, there has been questionable showing that their application results in the effective or efficient removal of contaminants.

Current methods involving the use of peroxide group (s) (i.e. hydrogen peroxide) in conjunction with iron salt catalyst(s) have shown to be relatively inefficient, often resulting in incomplete contaminant oxidation. Hydrogen peroxide in particular has been found to lack persistence in contaminated soils and groundwater due to rapid dissociation. Many of these current employed reactants are hazardous and difficult to handle.

Recently, the use of permanganate(s) has been found to be a more effective oxidizing agent of hazardous organic compound(s). However, known methods to use that ability to actually remediate a site requires exceedingly large quantities of permanganate(s) to overcome the natural oxidant demand exerted by the soil, thereby limiting the percentage available for oxidizing the hazardous organic compound(s). Large amounts of permanganate(s) are thus required per unit of soil and groundwater volume, limiting the application of this technology due to high cost. Additionally, a product of the permanganate(s) oxidation reaction is solid manganese dioxide which precipitates and clogs the soil or aquifer, resulting in a reduced permeability of the soil to water. Thus reducing the hydraulic conductivity thereof, and thereby inhibiting oxidant access to the entire contaminated site; rendering treatment of the soil and hazardous organic compounds incomplete. Further disadvantages of using permanganate(s) alone and in large quantities for subsurface remediation includes the formation of soluble manganese compounds in groundwater that may exceed drinking water standards. For this and the foregoing reasons, attempts to date to use permanganate(s) for in situ remedial applications have not been fully successful.

More recently, attempts have been made to resolve the disadvantages associated with the use of permanganate(s) by incorporating persulfate(s) oxidants into the in situ application. U.S. Pat. No. 6,474,908. The theory relied on therein utilizes the persulfate(s) to satisfy the total oxidant demand of the selected environment (soil, water, sludge, etc.) and then follow up with the permanganate(s) to treat target hazardous organic constituents. However, the total amount of permanganate(s) and persulfate(s) required to treat a large area is still excessive and the extent to which the reactant(s) travel in the aquifer before being spent or reacted is insufficient.

Because of these limitations of art before the present invention, there is a need for a method and reactant(s) for treating hazardous organic contaminant(s) in soil, sludge, groundwater, surface water, and wastewater that does not require electro-osmosis, heat, or inefficient metallic catalyst(s). What is needed are materials that are easy to handle, persistent in the zone(s) having the contaminant(s), and react with the contaminant(s) to form innocuous materials.

SUMMARY OF THE INVENTION

The present invention provides a method and reactant(s) for treating hazardous organic contaminant(s) in soil, sludge, groundwater, surface water, and wastewater that does not require electro-osmosis, heat, or inefficient metallic catalyst(s), provides for easy handling, persistent in the zone(s) having the contaminant(s), and reactive with the contaminant(s) to form innocuous materials.

The present invention relates to an environmental reactant(s) and process for the remediation of soil and water whether the contamination is a surface or subsurface contaminant. More specifically, an encapsulated reactant(s) and methods for controlling the release and/or distribution of the reactant(s) provides a means for remediation of soil, water, wastewater, and/or other environmental remediation and/or treatment for in situ or ex situ processes.

The controlled release and/or distribution of the reactant(s) is manipulated via an encapsulating coating which targets contaminants or specific organic compounds in the environmental media being treated. The reactants may be oxidants, catalysts, chelants, transition metal amine complexes, combinations thereof, and/or other chemical constituents that effectuate a reaction with the targeted compounds. The reaction between the encapsulated reactant(s) and the targeted organic compounds renders the media being treated to have less hazardous characteristics.

The encapsulated reactant of the present invention may have a single reactant contained within a single encapsulant, a plurality of reactants contained within a single encapsulant, or a plurality of reactants contained within a plurality of encapsulants. An outer encapsulant provides for the targeting characteristic of the encapsulated reactant by masking, protecting, stabilizing, delaying, and/or controlling the release and/or distribution of the reactant(s) contained within. In a preferred embodiment, the outer encapsulant is substantially oleophilic (i.e. has a stronger affinity for oils rather than water) which saves the reactant from reacting with water or untargeted constituents in the media being treated. Additionally, the outer encapsulant is substantially reactive, permeable and/or dissolvable with at least one of the target compound(s) being remediated. Therefore, when the encapsulated reactant is contacted with or exposed to the contaminants it dissolves, reacts, or absorbs at least one of the targeted compound(s) found in the media and exposes at least one reactant to the targeted compounds where it may react.

The encapsulated reactant typically has an organic compound in the outermost encapsulant providing the desired oleophilic and hydrophobic characteristics. The reactants contained within the encapsulant may be a variety of reactants such as catalysts, chelants, transition metal amine complexes, oxidants, or other reactants. The encapsulated reactant of the present invention may used to treat a variety of environmental media having a variety of contaminants.

The encapsulated reactants of the present invention can be used to treat soil, water, wastewater, silt, clay, etc. either in situ or ex situ. Different groups of encapsulated reactants having different reactants and/or different outermost encapsulants can be introduced into the media simultaneously, in discrete time intervals, at the same location, or at alternate locations. Such applications provide a means for effectuating a single reaction or multiple reactions, either in series or parallel toward a desired final media state.

DETAILED DESCRIPTION OF THE INVENTION

The present invention provides encapsulated reactant(s) and methods for controlling the release and/or distribution of one or more reactants that provide for methods of soil, water, water treatment, and/or other environmental remediation and/or treatment. The term water as used herein refers to water in a broad sense and incorporates natural solutes. Water is considered to be a universal solvent and has hardness, metals, and a variety of minerals and salts naturally dissolved and/or ionized therein. Therefore, water includes solutes except for selected contaminants and inerts. The encapsulated reactants of the present invention may be used in in situ or ex situ processes. The controlled release and/or distribution of the reactant(s) is manipulated via an encapsulating coating to target contaminants or specific organic compounds in the media being treated. The encapsulated reactants may be oxidants, catalysts, chelants, transition metal amine complexes, combinations thereof, and/or other constituents that effectuate an initial, intermediate, and/or final reaction with the organic compound(s) being targeted. The reaction between the encapsulated reactant(s) and the targeted organic compounds renders the media being treated to have less hazardous characteristics. As used herein, the term "encapsulated" means having a form of protective enclosure and includes all forms of encapsulants and coatings and includes micro-encapsulants. The encapsulated reactant(s) of the present invention are depicted in the various Figures which are selected solely for the purpose of illustrating the present invention. Other and different encapsulated reactant(s) may utilize the inventive features described herein. Reference to the Figures showing several embodiments of the presently claimed invention is made to describe the presently claimed invention and not to limit the scope of the claims herein.

Figure 1:
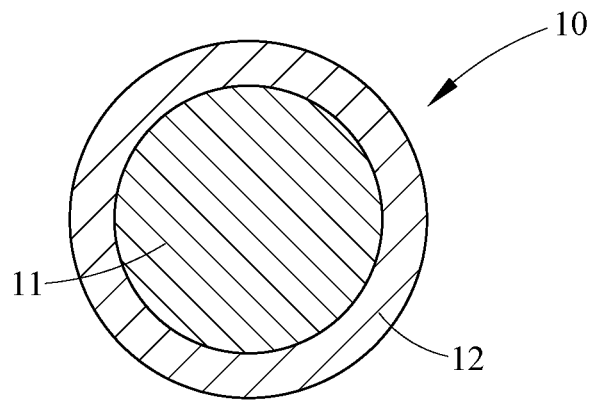
FIG. 1 is a cross-sectional view of an embodiment of the encapsulated reactant of the present invention showing one reactant within an encapsulant.

FIG. 1 shows a cross-sectional view of encapsulated reactant 10 of the present invention showing one reactant 11 within encapsulant 12. Outer encapsulant 12 provides for the targeting of organic constituents within the media being treated by masking, protecting, stabilizing, delaying, and/or controlling the release and/or distribution of reactant 11. Targeting is accomplished by having reactant 11 substantially isolated from the media and released or exposed to the contaminants or targeted organic compounds when encapsulated reactant 10 encounters the contaminants within the media being treated. Thus, encapsulant 12 saves reactant 11 from reacting with water or untargeted constituents in the media being treated so that reactant 11 remains substantially unreacted until contacting the targeted constituents. Therefore, reactant 11 is available for breaking down the targeted constituents when encapsulated reactant 10 encounters the targeted constituents within the media being treated.

The outer surface of outer encapsulant 12 contacts the media being treated and the inner surface of encapsulant 12 contacts reactant 11. Therefore, encapsulant 12 needs be substantially non-reacting, impermeable and/or non-disolving with the media being treated and reactant 11 (i.e., if media is water then encapsulant 12 is substantially water resistant). Additionally, encapsulant 12 needs be substantially reactive, permeable and/or dissolvable with at least one of the target organic compound(s) being treated. Thus, the composition of encapsulant 12 depends on the composition of reactant 11, the media being treated, and the targeted constituents.

Typically, in in situ remediation the media being treated is either water or has water moving within, such as soil. Therefore, outer encapsulant 12 needs be substantially non-reacting, impermeable and/or non-dissolving with water. At the same time, encapsulant 12 needs be soluble, reactive, and/or permeable to at least one of the targeted compound(s) found in the media or environment being treated. The targeted constituents being remediated typically have at least one organic compound and therefore encapsulant 12 typically is soluble, reactive, and/or permeable to at least one targeted organic compound within the zone of contamination in the media, At least one targeted organic compound can permeate, react, or dissolve with encapsulant 12.

Encapsulant 12 is characterized by having one or more of a plurality of mechanisms for releasing and/or contacting reactant 11 with at least one targeted compound. One mechanism in which encapsulant 12 may expose reactant 11 to targeted compounds is where at least one targeted organic compound permeates through encapsulant 12 causing an internal pressure of encapsulated reactant 10 to reach a level suitable for reverse osmosis, dispersing reactant 11 to the zone of contamination. A second mechanism involves encapsulant 12 dissolving and/or rupturing with at least one targeted organic compound releasing the encapsulated compounds or reactant 11 to the zone of contamination. Additionally, a "chemical trigger" can be incorporated within encapsulant 12 to allow for accelerated degradation of the encapsulant 12 and/or release of reactant 11 upon contact with the targeted compound groups being treated. The thickness, permeability, and/or composition of encapsulant 12 can be adjusted to control the rate at which at least one targeted compound penetrates, dissolves, and/or reacts with encapsulant 12 distributing and/or diffusing reactant 11.

Additionally, encapsulant 12 may be designed to sustain its characteristics for a period of time (days, weeks, or even months) when in contact with water. This characteristic of encapsulant 12 allows unreacted encapsulated reactants 10 to dissipate in the event they are not contacted with a targeted compound. Furthermore, encapsulant 12 may have the characteristic of not dissolving in a targeted compound or water, at least for an extended period of time, but being permeable to targeted compounds. Such an embodiment allows encapsulated reactant 10 to persist for an extended period of time allowing the targeted compounds to permeate through encapsulant 12 and react with reactant 11. The foregoing mechanisms and embodiments of the encapsulated reactant of the present invention are provided as descriptive examples only and are not to serve as limiting the claims herein.

Environmental remediation, water treatment, and/or wastewater treatment often times seeks to, via at least the final reaction, oxidize contaminants or compounds containing at least one oxidizable aliphatic or aromatic compound and/or functional group (e.g., chlorinated organics, aliphatic organics, aromatic organics, etc.). Examples include, but not limited to, atrazine, benzene, butyl mercaptan, chlorobenzene, chloroethylvinyl ether, chloromethyl methyl ether, chlorophenol, chrysene, cyanide ion or organic cyanides, dichlorophenol, dichlorobenzene, dichloroethane, dichloroethene, dichloropropane, dichloropropene, ethyl alcohol, ethylbenzene, ethylene glycol, ethyl mercaptan, hydrogen sulfide, isopropyl alcohol, Lindane™., methylene chloride, methyl ten-butyl ether, naphthalene, nitrobenzene, nitrophenol, pentachlorophenol, phenanthrene, phenol, propylene, propylene glycol, Silvex™, Simazine™, sodium sulfide, tetrachloroethane, tetrachloroethene, toluene, trichlorobenzene, trichloroethane, trichloroethene, trichlorophenol, vinyl chloride, xylene, etc). Many, if not most, of these contaminants are organic based and exhibit some properties similar as oil.

Encapsulant 12 typically has a hydrophobic or water resistant compound and is substantially non-reactive with adjacent reactant 11 and is substantially permeable or dissolvable with at least one targeted organic compound. Therefore, encapsulant 12 is often times desired to be both substantially hydrophobic and substantially oleophilic, since many if not most of the targeted compounds exhibit similar properties as oil. Compounds found to have such attributes or properties desired in outer encapsulant 12 have been determined to include those that comprise polymers of: ethylene, propylene, isobutylene, diisobutylene, styrene, ethylinylbenzene, vinyltoluene, and dicyclopentadiene; esters of acrylic and methacrylic acid, including the methyl, ethyl, propyl, isopropyl, butyl, sec-butyl, tert-butyl, amyl, hexyl, octyl, ethylhexyl, decyl, dedecyl, cyclohexyl, isobornyl, phenyl, benzyl, alkylphenyl, ethoxymenthyl, ethoxyethyl, ethoxypropyl, propoxymethyl, propoxyethyl, propoxpropyl, ethoxphenyl, ethoxybenzyl, and ethoxycyclohexyl esters; vinyl esters, including vinyl acetate, vinyl propionate, vinyl butyrate; vinyl ketones, including vinyl methyl ketone, vinyl ethyl ketone, vinyl isopropyl ketone, and methyl isopropenyl ketone; vinyl ethers, including vinyl methyl ether, vinyl ethyl ether, vinyl propyl ether, and vinyl isobutyl ether; diallyl phthalate, ethylene glycol diacrylate, ethylene glycol dimethacrylate, trimethylolpropanetrimethacrylate, divinylsulfone; polyvinyl and polyaUy ethers of ethylene glycol, of glycerol, of pentaerythritol, of diethyleneglycol, of monothio- and dithioderivatives of glycols, and of resorcinol; divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarboxylate, triallyl aconitate, triallyl citrate, triallyl phosphate, divinyl naphthalene, divinylbenzene, trivinylbenzene; alkyldivinylbenzenes having from 1 to 4 alkyl groups of 1 to 2 carbon atoms substituted on the benzene nucleus; trivinylnaphthalenes, and/or polyvinylanthracenes, etc., and the like. Other organic compounds such as cellulose, wax (i.e. canola wax), polylactic acid, and combinations and derivatives thereof have been found to exhibit the desired attributes of outer encapsulant 12. These constituents are presented herein as examples of compounds that may be incorporated into encapsulant 12 and are not to serve as a limitation on the composition of encapsulant 12.

In certain exemplary embodiments, encapsulant 12 can range from approximately 10% to approximately 80% of the total weight of encapsulated reactant 10. Additionally, for subsurface applications, encapsulant 12 may advantageously have an outer dimension of less than 50 tm, and more advantageously less than 10 µm. Such a configuration is advantageous for groundwater treatment. Therefore, embodiments of encapsulated reactant 10 may be referred to as microencapsulants. Alternatively, encapsulant 12 may have a large outer dimension of up to an inch, or even more. Such larger size may be advantageous for surface water or waste water treatment.

Reactant 11 is selected to react with at least one target constituent in the media being remediated. Reactant 11 may comprise one or more oxidant constituents that can comprise: peroxides, permanganates, persulfates, hypochlorite solutions, ozone, and/or fluorine, etc. Peroxide, such as hydrogen peroxide, sodium peroxide, calcium. peroxide, potassium peroxide, and/or magnesium peroxide, etc, has been found effective in oxidizing many organic contaminants. Reactant 11 may comprise an oxidant suspended in an aqueous catalyst solution comprising a soluble metallic salt(s) (e.g., ferrous sulfate), chelate(s), and/or buffering agent(s). In certain environments, it may be advantageous to have the aqueous catalyst solution to have a circumneutral pH (e.g., a pH of approximately 5.5 to approximately 8.5, including all values and subranges there between). In other environments, an intermediate reaction between the aqueous catalyst solution and reactant 11 can be pH-independent. In still other environments, an intermediate reaction between the aqueous catalyst solution and reactant 11 can be pH-dependent.

Figure 2:
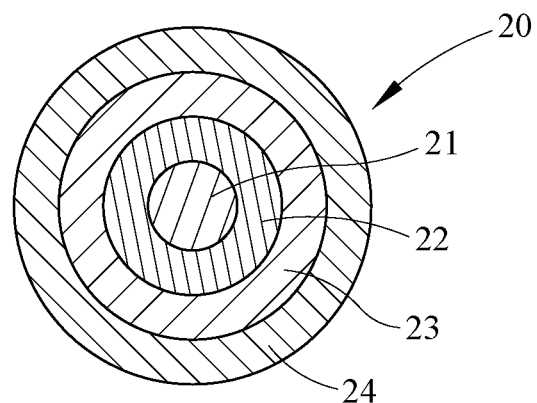
FIG. 2 is a cross-sectional view of an embodiment of the encapsulated reactant of the present invention showing a first and second reactant within a first and second encapsulant respectively.

FIG. 2 shows a cross-sectional view of an embodiment of encapsulated reactant 20 of the present invention showing a first reactant 21 and a second reactant 23 within a first encapsulant 22 and second encapsulant 24 respectively. Reactant 21 may be a core oxidant or other reactant while reactant 23 may be the same or a different constituent (e.g. a catalyst) trapped between inner encapsulant 22 and the most outer encapsulant 24. In one embodiment of encapsulated reactant 20, a particle can comprise an inner oxidant core 21, surrounded by, yet potentially separated via encapsulant 22 from, an outer catalyst 23 that is surrounded by an outermost encapsulating coating 24. Thus, the core oxidant 21 can be segregated from the catalyst by the internal coating 22, and the catalyst can be segregated from the external environment by the secondary external coating or encapsulant 24. Alternatively, particle or reactant 21 can be an inner catalyst core, surrounded by, yet potentially separated from, an outer encapsulated oxidant 23. Encapsulating multiple constituents into one particle can provide a means for ensuring that the encapsulated constituents are released within the subterranean environment in the presence of one another to produce the desired intermediate reaction, and thus, the desired final reaction. This approach can provide particular utility in heterogeneous subterranean environments that extend over a relatively large area and/or volume. In this embodiment, encapsulant 24 needs to have similar characteristics as encapsulant 12, since both are exposed to the media that is being treated. However, inner encapsulant 22 may be permeable to water or the media in which it is distributed since it does not contact the media until the media penetrates outer encapsulant 24. Therefore, encapsulant 22 only need be non-reactive with reactants 21 and 23.

Figure 3:
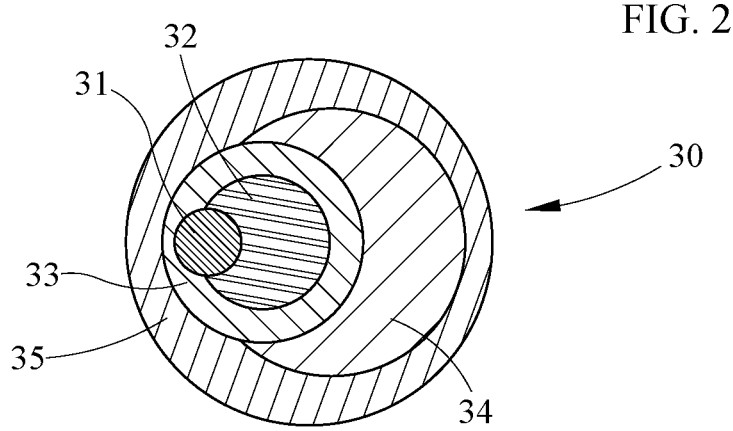
FIG. 3 is a cross-sectional view of an embodiment of the encapsulated reactant of the present invention showing a plurality or reactants within a plurality of encapsulants.

FIG. 3 shows a cross-sectional view of encapsulated reactant 30 of the present invention showing a first reactant 31 and a second reactant 32 within a first encapsulant 33. A third reactant 34 is between first or inner encapsulant 33 and second encapsulant 35. Reactants 31 and 32 may be a core oxidant or other reactant and a catalyst, chelant, transition metal amine complex, other oxidant, or other reactant. Reactant 34 may be the same or a different constituent than reactants 31 and 32 trapped between inner encapsulant 33 and the most outer encapsulant 35. Encapsulating multiple constituents or reactants 31, 32, and 34 into one particle or encapsulated reactant 30 can provide a means for contacting the reactants 31, 32, 34 in a specific sequence to produce the desired intermediate reaction, and thus, the desired final reaction. In this embodiment, encapsulant 35 needs to have similar characteristics as encapsulant 12, since both are exposed to the media that is being treated. However, inner encapsulant 33 may be permeable to water or the media in which it is distributed since it does not contact the media until the media penetrates outer encapsulant 35. Therefore, encapsulant 33 only need be non-reactive with reactants 31, 32 and 34. As shown here, encapsulated reactant 30 can have a variety of reactants and encapsulants such that an outer encapsulant 35 saves the contained reactants and encapsulants until encountering a target constituent. In such an embodiment, a plurality of reactants, chelants, transition metal amine complexes, and/or catalysts can be introduced into environment having targeted compounds in a controlled manner with a plurality of encapsulants.

The encapsulated reactant(s) of the present invention may be produced by first grinding or comminution: media milling (ball milling, attritor milling, wet or dry processing, etc.); media-less milling (hammer mills, cryogenic hammer mills, jet milling jaw crushing high pressure dispersion milling microfluidization etc.); screening and/or sieving; air classification, etc. the reactant(s). The reactant(s) can then be encapsulated or coated by spray drying and prilling; dry powder coating; melt coating, deposition, etc.

The encapsulated reactant of the present invention may be used in treating surface water, groundwater and/or soil in situ or ex situ. For surface water and surface soil treatment, the encapsulated reactants are typically placed directly on the zone of contamination or in the path of migration of the contaminants or targeted compounds. For in situ treatment of groundwater or soil, the encapsulated reactants are typically injected into the zone of contamination through a well. The injection may be accomplished by gravity feed or by forcing the encapsulated reactants into the subsurface with a pump. In certain exemplary embodiments, the encapsulated reactant can be injected (via an aqueous media) into the subterranean environment at pressures ranging up to approximately 8 psig. The injection pressure can be dependent on the subterranean formation and/or the ability of the subterranean formation to accept the injected solution without substantial subterranean fractures and/or preferential pathways being created. In some subterranean formations it may be practical to inject the encapsulated reactant at a head pressure in excess of 8 psig.

The effective radius and/or path of subterranean influence, in regards to the above referenced embodiment, can be monitored by utilizing tracer agents (e.g., bromide, chloride, rhodamine, flourescein, and/or sulfur hexafluoride, etc.). The tracer can be compatible with site conditions and/or one or more of the constituents being employed. The tracer can be placed in the same aqueous media as the encapsulated reactants or particles and/or within the particles and/or their coating(s) or encapsulant(s). With respect to subterranean background levels (of, for example, conductivity values and/or specific ion levels), tracer concentrations preferably range from approximately 10 to 100 times greater.

Once the mixture is injected into the subterranean environment, environmental monitoring wells can be monitored and/or sampled for tracer detection (environmental monitoring wells can be strategically located within and/or adjacent to the area(s) of potential chemical impact and/or interest). As suggested above, the tracer can be detected by, for example, monitoring the conductivity levels of the groundwater compared against native background levels or by utilizing an ion specific electrode. An effective radius of subterranean influence can be assessed by measuring and/or comparing specific groundwater parameters (e.g., dissolved oxygen levels, oxidation reduction potential, salinity, and/or pH levels, etc.) before, during, and/or after the injection process. Fluctuations in these parameters can be observed in subterranean areas where an oxidation reaction has occurred.

Certain exemplary embodiments can provide a treatment technique for any and/or all of the above listed chemical contaminant(s) within a variety of medias and/or subterranean environments comprising: silts, clays, sands, fractured bedrock, karsts, organics, and/or tills. Via certain exemplary embodiments, in situ environmental remediation within subsurface bedrock and/or fractured bedrock networks can be greatly increased due to the above mentioned adjustable properties of the particle and/or aqueous mixture.

Alternatively, a trench may be dug down flow of a plume of contamination in the aquifer and filled with the encapsulated reactants of the present invention. In this application, the outer encapsulant may be designed to remain intact for an extended period of time (i.e. years) and as the plume of contamination passes through the trench, the encapsulant allows the targeted constituents to react with the reactant(s). Whether injected into the subterranean environment or placed in a trench around the plume of contamination, a reactive oxidant can be kept segregated from a metallic salt(s), chelate(s), and/or buffering agent(s) by internal encapsulation, hence deferring any intermediate reaction there between. Once the desired time or condition of exposure to an aqueous environment has elapsed and/or a "triggered" exposure to the contaminant(s) of concern has occurred, the outer encapsulant can release the oxidant into the presence of the metallic salt(s), chelate(s), and/or buffering agent(s), allowing any intermediate reaction there between to occur, and thereby resulting in the production of oxidizing free radicals, hydroxyl radicals, sulfate radicals, or the like possibly by virtue of a mimicked Fenton's reaction. The radicals can undergo a final reaction with the contaminant(s) of concern, oxidizing the contaminant compound(s) (typically exothermically), oftentimes into final products of carbon dioxide and water.

The method of the present invention uses a combination of one or more encapsulated oxidant(s), metallic salt catalyst(s), and/or chelating agent(s) under conditions which enable oxidation of most, and preferably substantially all, targeted volatile, semi-volatile, or non-volatile organic and/or inorganic compounds in soil, rock, sludge, water, groundwater, and/or wastewater (in situ or ex situ) rendering them less harmful. In one embodiment of the present invention, a combination of encapsulated oxidant(s) (a persulfate group-potassium or sodium), catalyst(s) (iron salt), and chelating compound(s) (EDT A) are injected into the subsurface simultaneously within an aqueous mixture, slurry, or suspension. For instance, the combination of encapsulated reactants may include a first group of encapsulated reactants having persulfate and a second group of encapsulated reactants having ferrous sulfate. Injection into the subsurface can be gravity fed or under pressure, both resulting in the dispersion of the encapsulated compounds within the targeted area of concern including both up-gradient and down-gradient placements. The encapsulated compounds of the present invention will remain substantially unreactive within the subsurface until contact with the target contaminant occurs. Upon contact, the coatings of the encapsulated substances will begin to degrade, weaken, or become more permeable until the encapsulated compound is released in the presence of the target contaminant(s). The released oxidant and/or catalyst and/or chelating agent react independently or in combination, resulting ultimately in the partial or complete oxidation of the target contaminant(s). The final by-products of the oxidation reaction are typically carbon dioxide, water, a salt group (depending on oxidant of choice), and an inorganic chloride ion (if contaminant is chlorinated).

In another selected embodiment of the present invention, a reactant having sodium persulfate and optionally a catalyst, i.e. one or more metallic salts, is contained within an encapsulant having cellulose, wax, polylactic acid, or combinations or derivatives thereof. Such an embodiment has been found to provide persistence of the reactant(s) in water until the encapsulated reactants encounter the targeted compounds at which point the reactant(s) break down the targeted constituents rendering them less harmful.

The outer encapsulant surrounding the reactant(s) can be designed to delay the chemical reaction between reactant and targeted contaminant(s) to allow for an extended coverage area and/or time when applied to subsurface treatment. Additionally, the size of the encapsulated reactant can be preselected to allow for less restricted flow through the subterranean environment, and thereby can provide for extended coverage areas and/or reduced loading restrictions. Encapsulated reactants can also be engineered to rise, sink, and/or be suspended within subterranean aqueous environments by adjusting buoyancy and/or specific gravities of the encapsulated reactant(s) of the present invention. Buoyancy can be adjusted by trapping a small gas bubble within the encapsulation, to off-set the density of one or more constituents. A more buoyant (overall density of encapsulation ("solute") less than aqueous media ("solution") encapsulated particle can be utilized when treating light non-aqueous phase liquid(s) chemical(s) of concern, which can be more abundant toward the upper approximately 25% of the aqueous media. A less buoyant (overall density of encapsulation ("solute") greater than aqueous media ("solution") encapsulated particle can be utilized when treating dense non-aqueous phase liquid(s) chemical(s) of concern, which can be more abundant in the lower approximately 25% of the aqueous media.

The advantages of the present invention over the prior art are many. The substantially hydrophobic and substantially oleophilic outer encapsulant in the encapsulated reactants provides a means to control the release of reactant(s) until contact occurs with the targeted contaminants. This provides highly efficient contaminant destruction ratios using lesser amounts of oxidant(s), catalyst(s), and/or chelating agents. It greatly increased areas of influence, both horizontally and vertically, from point of application or injection. It provides more capability of controlling the encapsulated reactant's path of travel or distance since the properties of the outer encapsulant may be modified. The encapsulated reactant's size, surface area, buoyancy, specific gravity, density, etc. can be manipulated to engineer encapsulated reactant(s) to float, suspend, or sink within the subsurface providing an increased means of reaching targeted contaminants.

The invention claimed is:

1. A process for treatment of a subterranean zone of contamination, the subterranean zone being contaminated by a target contaminant, the process comprising the steps of:
   melting a mass of solid encapsulant and converting the solid encapsulant to a non-solid state;
   combining a plurality of reactant particles with the non-solid state encapsulant and coating the plurality of reactant particles with the melted encapsulant, thereby making an encapsulated reactant having the plurality of reactant particles therein;
   cooling the encapsulated reactant to produce a solid encapsulated reactant; and
   controlling the size and mass of the solid encapsulated reactant such that the solid encapsulated reactant is of sufficient size and mass that it will not flow through the subterranean zone of contamination; and
   placing the solid encapsulated reactant in the subterranean zone, thereby contacting the target contaminant with the solid encapsulated reactant and treating the subterranean zone of contamination.

2. The process of treatment of a subterranean zone of contamination of claim 1 further comprising substantially maintaining the placement of the solid encapsulated reactant in the subterranean zone.

3. The process of treatment of a subterranean zone of contamination of claim 1 further comprising mixing the solid encapsulated reactant with a liquid forming a mixture, suspension, or slurry, and the step of placing the solid encapsulated reactant in the subterranean zone comprises placing or injecting the mixture, suspension, or slurry, into the subterranean zone.

4. The process of treatment of a subterranean zone of contamination of claim 1 further comprising controlling the permeability of the encapsulant to have a predetermined permeability, thereby affecting a rate of degradation, weakening, or permeation of the encapsulant.

5. The process of treatment of a subterranean zone of contamination of claim 1 further comprising controlling a surface area of the solid encapsulated reactant to have a predetermined surface area, thereby affecting a rate of reactant release.

6. The process of treatment of a subterranean zone of contamination of claim 1, wherein the step of combining the plurality of reactant particles with the non-solid state encapsulant and coating the plurality of reactant particles with the melted encapsulant comprises combining the plurality of reactant particles with the non-solid state encapsulant at a ratio providing the encapsulant at approximately 10% to 80% of a total mass of the solid encapsulated reactant, thereby affecting a rate of degradation, weakening, or permeation of the encapsulant.

7. The process of treatment of a subterranean zone of contamination of claim 1, wherein the encapsulant comprises a substantially oleophilic or hydrophobic compound.

8. The process of treatment of a subterranean zone of contamination of claim 7, wherein the substantially oleophilic or hydrophobic compound comprises a constituent selected from the group consisting of cellulose, wax, polylactic acid, and combinations and derivatives thereof.

9. The process of treatment of a subterranean zone of contamination of claim 1, wherein the plurality of reactant particles comprises at least one oxidant.

10. The process of treatment of a subterranean zone of contamination of claim 9, wherein the at least one oxidant comprises a chemical moiety selected from the group consisting of persulfate, permanganate, and peroxygen.

* * * * *